(12) United States Patent
Srbinovski et al.

(10) Patent No.: US 10,347,444 B2
(45) Date of Patent: Jul. 9, 2019

(54) PADDLE SWITCH SYSTEM

(71) Applicant: Judco Partnership, LLC, Harbor City, CA (US)

(72) Inventors: Igorce Srbinovski, Harbor City, CA (US); Thomas E. Buttner, Palos Verdes Estates, CA (US); Stephen C. James, Highland Park, CA (US)

(73) Assignee: JUDCO PARTNERSHIP, LLC, Harbor City, CA (US)

( * ) Notice: Subject to any disclaimer, the term of this patent is extended or adjusted under 35 U.S.C. 154(b) by 0 days.

(21) Appl. No.: 15/167,505

(22) Filed: May 27, 2016

(65) Prior Publication Data

US 2016/0276118 A1 Sep. 22, 2016

Related U.S. Application Data

(63) Continuation of application No. 14/214,422, filed on Mar. 14, 2014, now Pat. No. 9,376,068.
(Continued)

(51) Int. Cl.
| | |
|---|---|
| *H01H 21/22* | (2006.01) |
| *B60R 16/00* | (2006.01) |
| *G05G 1/02* | (2006.01) |
| *H01H 21/04* | (2006.01) |
| *H01H 21/28* | (2006.01) |
| *H01H 13/48* | (2006.01) |
| *F16H 59/02* | (2006.01) |

(52) U.S. Cl.
CPC .......... *H01H 21/22* (2013.01); *B60R 16/005* (2013.01); *G05G 1/02* (2013.01); *H01H 21/04* (2013.01); *H01H 21/285* (2013.01); *F16H 2059/0247* (2013.01); *H01H 13/48* (2013.01); *H01H 2215/004* (2013.01); *H01H 2231/026* (2013.01)

(58) Field of Classification Search
CPC ............ H01H 1/50; H01H 3/60; H01H 21/23; H01H 21/22; H01H 21/285; H01H 21/04; H01H 2231/026; H01H 2215/004; H01H 13/48; H01H 50/305; G05G 1/02; B60R 16/005; F16H 2059/0247
USPC .......................................... 200/301, 339–345
See application file for complete search history.

(56) References Cited

U.S. PATENT DOCUMENTS

| | | | |
|---|---|---|---|
| 4,242,552 A | * | 12/1980 | Tibolla ................. H01H 23/145 |
| | | | 200/330 |
| 4,897,629 A | | 1/1990 | Lecklider |

(Continued)

OTHER PUBLICATIONS

Non-Final Office Action for U.S. Appl. No. 14/214,422 dated Sep. 8, 2015.
(Continued)

*Primary Examiner* — Ahmed M Saeed
(74) *Attorney, Agent, or Firm* — Brooks Acordia IP Law, PC; Michael Zarrabian

(57) ABSTRACT

A paddle switch system comprises a housing, a paddle having a pivot member pivotally disposed in the housing for operating an electrical switch within the housing in response to a force on the paddle, a cover coupled to the housing wherein the housing and the cover partially enclose the paddle, and a vibration reduction mechanism disposed in the housing proximate the pivot member of the paddle. The electrical switch comprises a dome switch and the paddle is disposed in the housing to partially preload the dome switch.

15 Claims, 14 Drawing Sheets

Related U.S. Application Data

(60) Provisional application No. 61/791,824, filed on Mar. 15, 2013.

(56) References Cited

U.S. PATENT DOCUMENTS

| | | | |
|---|---|---|---|
| 5,934,453 A * | 8/1999 | Sugawara | H01H 23/143 200/339 |
| 7,518,078 B1 | 4/2009 | Dodal | |
| 9,376,068 B2 * | 6/2016 | Srbinovski | B60R 16/005 |
| 2002/0100673 A1 * | 8/2002 | Bulin | H01H 23/14 200/339 |
| 2010/0258631 A1 * | 10/2010 | Rueblinger | G06K 7/10881 235/462.48 |

OTHER PUBLICATIONS

Notice of Allowance for U.S. Appl. No. 14/214,422 dated Feb. 26, 2016.

* cited by examiner

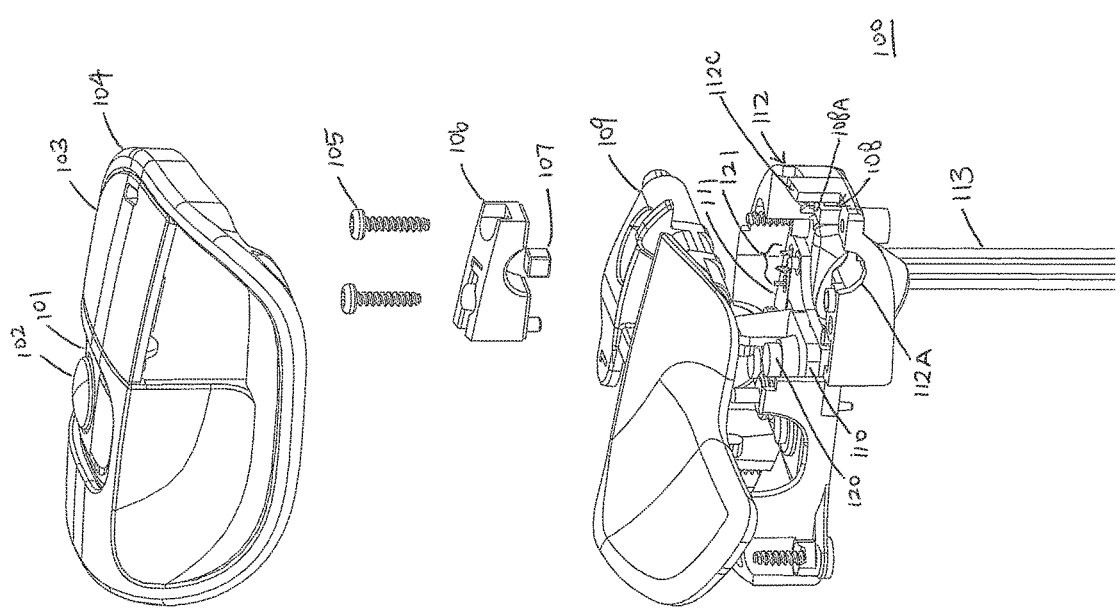

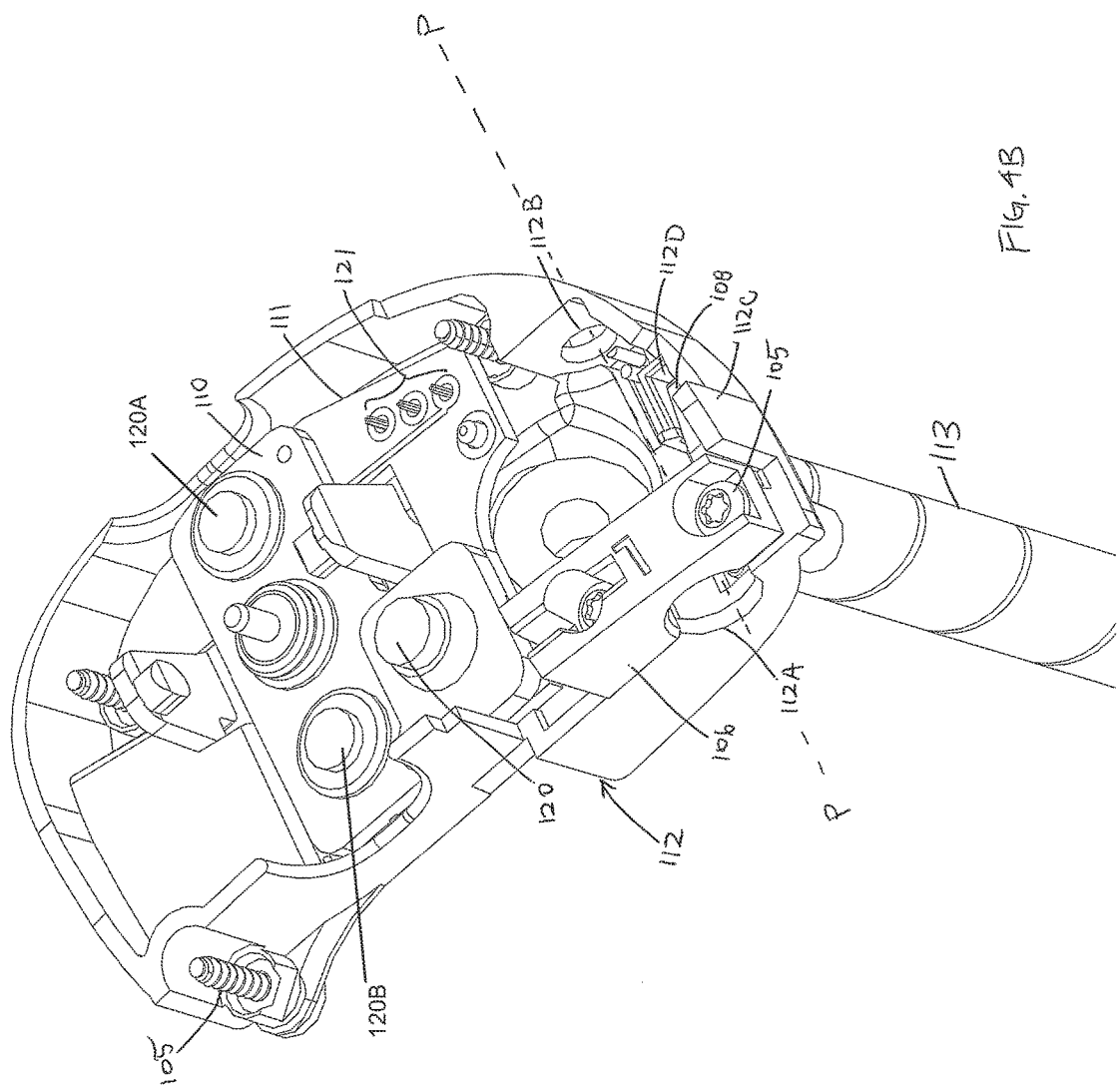

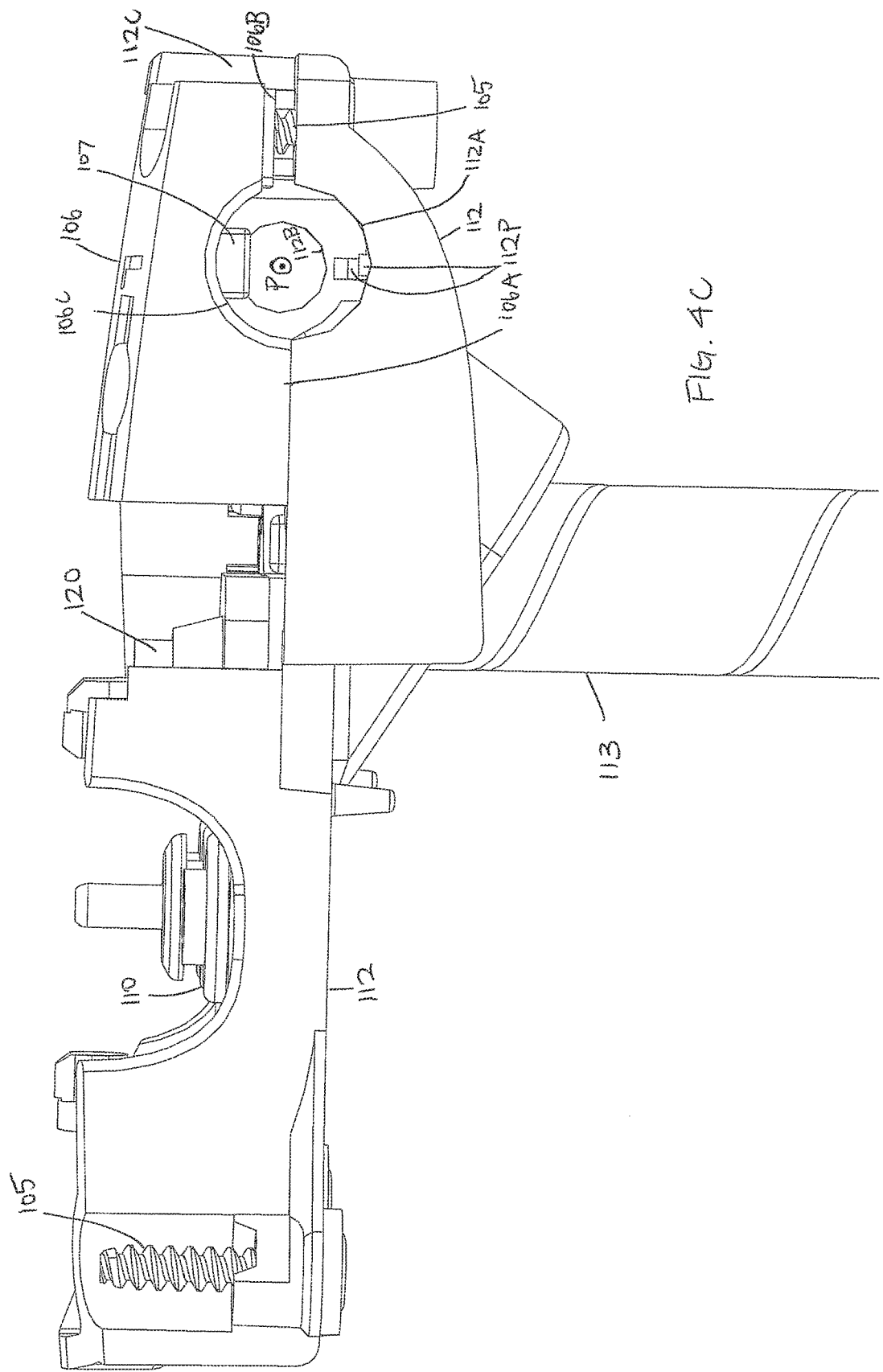

PADDLE SWITCH SYSTEM

CROSS-REFERENCE TO RELATED APPLICATIONS

This application is a continuation of allowed U.S. patent application Ser. No. 14/214,422, filed Mar. 14, 2014, which claims the priority benefit of U.S. Provisional Patent Application Ser. No. 61/791,824, filed Mar. 15, 2013, incorporated herein by reference in its entirety.

FIELD OF THE INVENTION

The present invention related to electrical switches, and in particular to electrical paddle switches.

BACKGROUND

Paddle switches are used in application such as automotive application for operating electrical components. A typical paddle switch is position behind a vehicle steering wheel, and includes an electrical switch that is operated for closing/opening a circuit. The electrical switch is opened/closed using a pivoting paddle which is operated by a user. The paddle switch may be used for controlling electrical circuits for a transmission gear selector, operating a radio, etc.

BRIEF SUMMARY

A paddle switch system comprises a housing, a paddle having a pivot member pivotally disposed in the housing for operating an electrical switch within the housing in response to a force on the paddle, a cover coupled to the housing wherein the housing and the cover partially enclose the paddle, and a vibration reduction mechanism disposed in the housing proximate the pivot member of the paddle.

In one embodiment, the electrical switch comprises a dome switch and the paddle is disposed in the housing to partially preload the dome switch.

These and other features, aspects and advantages of the present invention will become understood with reference to the following description, appended claims and accompanying figures.

BRIEF DESCRIPTION OF DRAWINGS

FIG. 4A shows a partially exploded view of the paddle switch system, according to another embodiment.

FIG. 4B shows a perspective view of the partially assembled paddle switch system, according to another embodiment.

FIG. 4C shows a perspective cross sectional view of the partially assembled paddle switch system, according to another embodiment.

DETAILED DESCRIPTION

The following description is made for the purpose of illustrating the general principles of the disclosed embodiments, and is not meant to limit the disclosed concepts herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments of a paddle switch system for operating an electrical switch are disclosed herein. An implementation of the paddle switch system comprises a paddle switch for gear selector devices in vehicles comprising an automatic transmission. Such gear selector devices allow the driver to select gears or shift gears of the automatic transmission, such as paddle shifting. Embodiments of the paddle switch system are applicable to other electrical switching use and are not limited to paddle shifting of automatic transmissions.

In one application, the paddle switch system may be mounted in a vehicle such as in a steering-column-mounted paddle shifter. In one embodiment, the paddle switch may be mounted to or behind the steering wheel of a vehicle to move with the steering wheel. This mounting arrangement allows the driver to keep both hands on the steering wheel at all times and allows for steering-wheel-mounted controls.

In one embodiment, the paddle switch system includes a vibration reduction mechanism for dampening vibration in the paddle switch system. As a vehicle travels on a surface (e.g., a road for a vehicle or water for a boat), vibration due to contact with that surface is mechanically transmitted to the steering wheel and to the paddle switch system. An embodiment of the paddle switch system comprises a vibration reduction mechanism for dampening vibration in the paddle switch system and reducing associated unwanted sounds (such as rattling).

Figure 1:
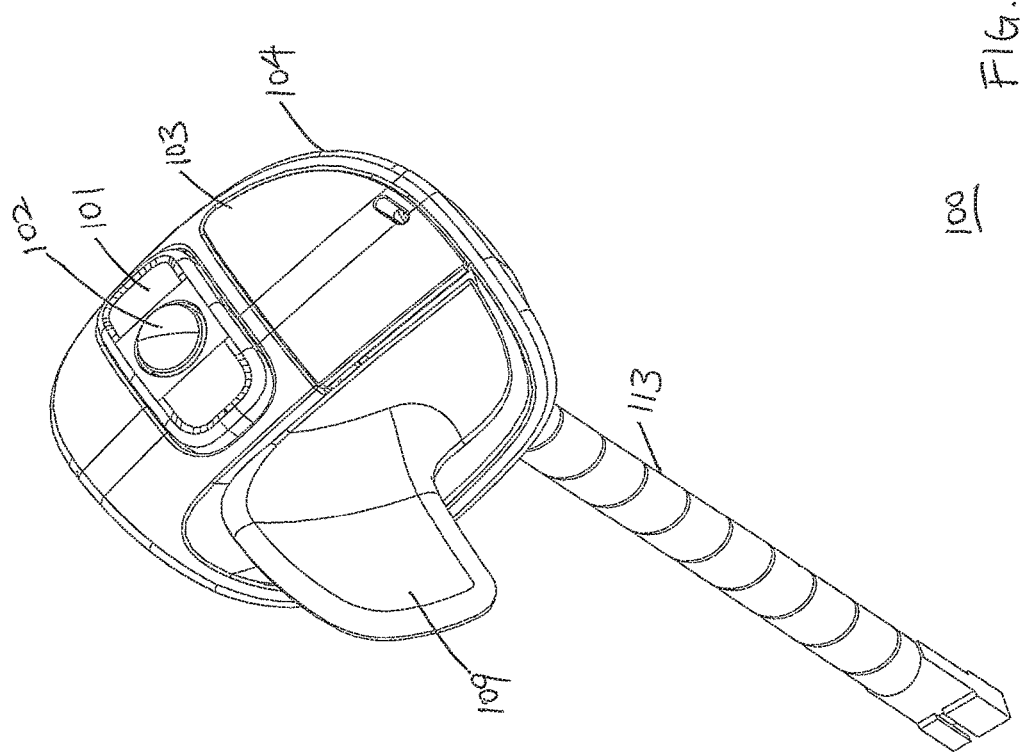
FIG. 1 shows an embodiment of a paddle switch system disclosed herein, according to another embodiment.
Figure 2:
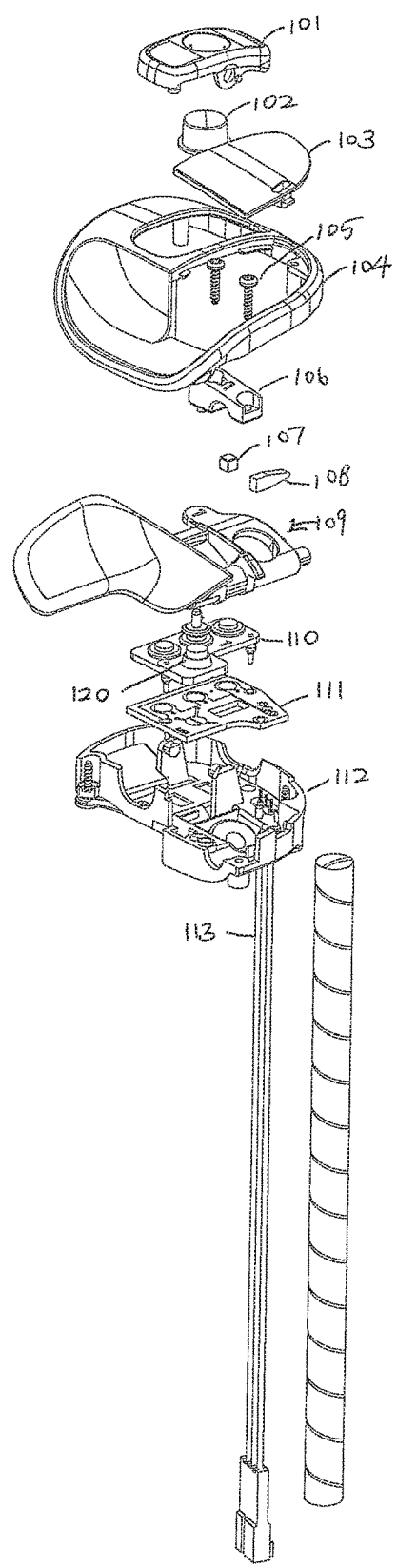
FIG. 2 shows an exploded view of the paddle switch system, according to another embodiment.
Figure 2A:
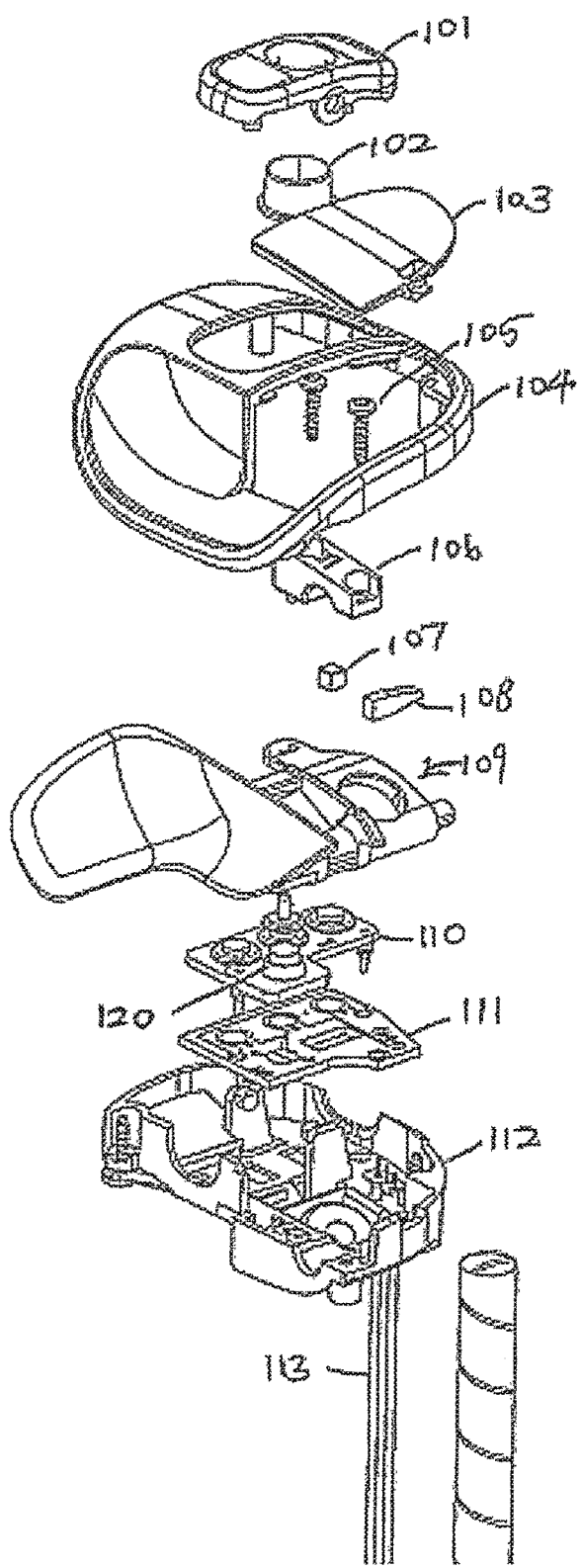
FIG. 2A shows a more detailed exploded view of the paddle switch system, according to another embodiment.

FIG. 1 shows an embodiment of a paddle switch system 100, disclosed herein. FIG. 2 shows an exploded view of the paddle switch system 100, and FIG. 2A shows a more detailed exploded view of the paddle switch system 100. Generally, left-hand side and right-hand side paddle switches may be mirror image assemblies of one another comprising similar components. The paddle switch system 100 may be mounted to or behind the steering wheel and is intended to move with the steering wheel.

As shown in FIGS. 1, 2 and 2A, in one embodiment the paddle switch system 100 comprises a housing 112, a printed circuit board (PCB) 111, a keypad 110 comprising a dome switch 120, a stop member 108, a paddle 109, a saddle 106, multiple fasteners 105, a rocker 101, a center button 102, a cover 104, a door 103, multiple wires 113 which may be wrapped by tape, and a cube bumper 107.

The keypad 110 comprises multiple dome switches for one or more functionalities including a dome switch 120 for gear switching functionality, such that when a dome switch is pushed, the corresponding functionality is triggered through the conversion of a mechanical input (e.g., a push of the dome switch) to an electrical signal by interfacing with the PCB 111. The keypad 110 includes other dome switches such as 120A, 120B for radio controls, according to one embodiment. In one embodiment, switches 120A and 120B for radio controls, can be similar to switch 120. In one embodiment, other switch domes 120A and 120B of the keypad for radio controls may comprise metal domes.

The interface for triggering the corresponding functionality include, but are not limited to, a pinout 121 connecting from the PCB 111 to the multiple wires 113 for propagating an electronic signal to an onboard interface elsewhere on the vehicle. A power source powering the system 100 comprises an onboard vehicle battery, etc.

The combination of the housing 112, the cover 104, and the door 103 provide a housing that encapsulates a portion of the paddle 109 as well as most of the components and circuitry necessary for implementing the embodiment.

In one embodiment, the system 100 may also comprise audio controls including the rocker 101, the center button 102, and the keypad 110 that may be used to toggle audio functions, such as volume control, track control, audio source, etc., via dome switches on the keypad 110. However, it is understood that the system 100 need not include said audio controls in order to implement the present invention and that the system 100 alternatively can have audio only as well.

Figure 3A:
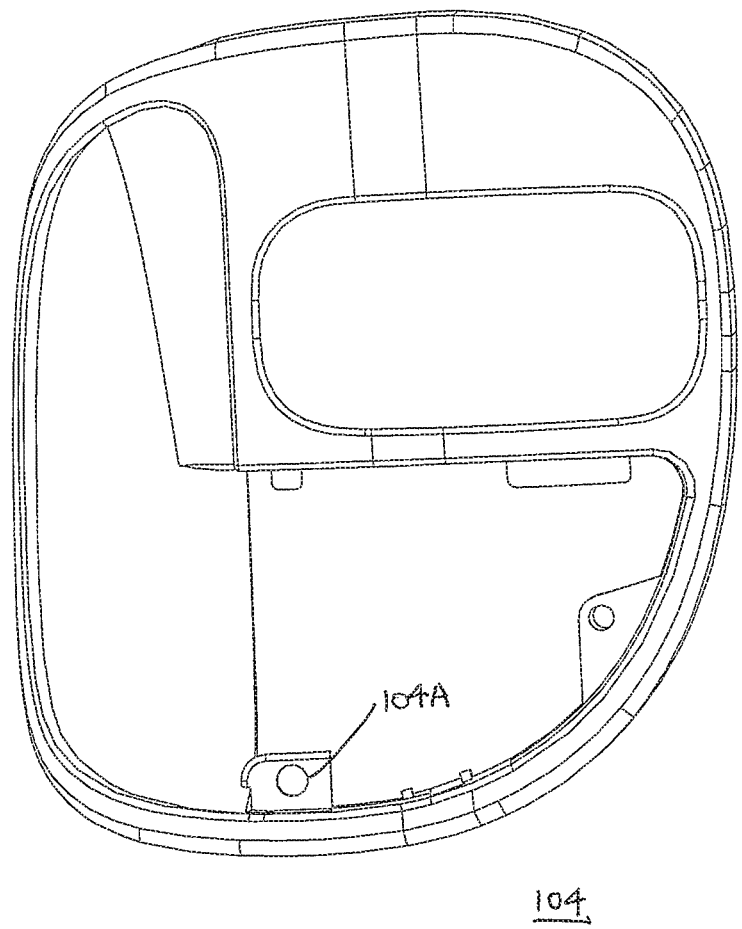
FIG. 3A shows a top view of a cover of the paddle switch system, according to another embodiment.

FIG. 3A shows a top view of the cover 104 to be used in the system 100 shown in FIG. 1, according to one embodiment. The cover 104 comprises an essentially semicircular frame that is removably secured onto the housing 112 via fasteners 105 (FIG. 2), and the housing 112 comprises multiple openings for receiving the paddle 109, the rocker 101, the keypad 110, the PCB 111, the center button 102, and the door 103 thereon. In one embodiment, the cover 104 comprises one or more holes 104A for receiving fasteners 105 to secure the cover 104 to the housing 112.

Figure 3B:
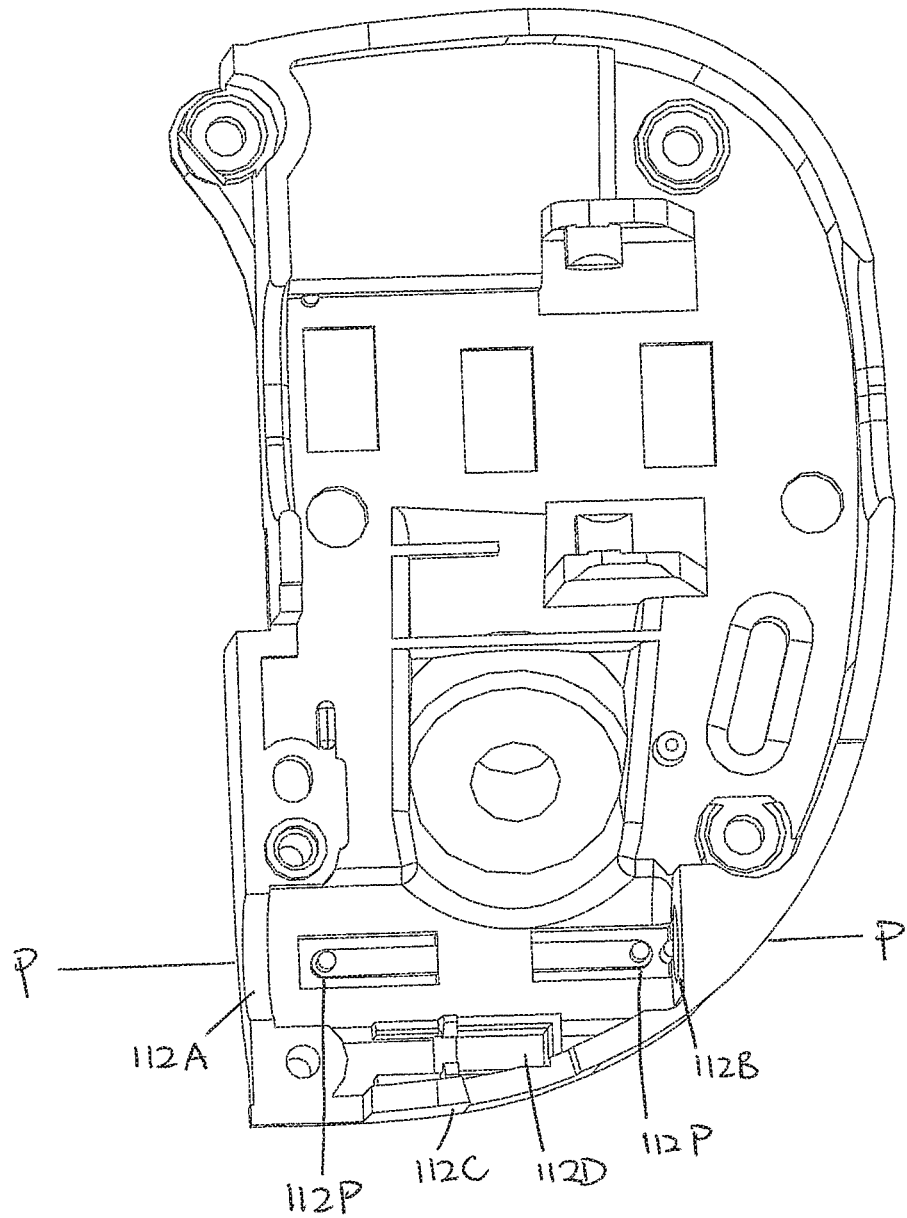
FIG. 3B shows a top view of the housing of the paddle switch system, according to another embodiment.

FIG. 3B shows a top view of the housing 112 to be used in the system 100 shown in FIG. 1, according to one embodiment. In one embodiment, the housing 112 comprises an essentially semicircular frame, wherein a base of the housing 112 includes a plurality of aligned holes and/or notches for maintaining the PCB 111 and for seating the keypad 110 thereon.

The housing 112 also comprises openings for receiving the multiple wires 113 for propagating the electrical signals received from the PCB 111 for triggering a desired functionality. In one embodiment, the housing 112 comprises a cavity 112D for receiving a stop member 108. In one embodiment, the stop member 108 comprises a top surface 108A (FIG. 4A), and is disposed in the cavity 112D within the housing 112 such that the stop member 108 is oriented adjacent to a housing wall 112C, essentially parallel to the axis P shown in FIG. 3B. In one embodiment, the stop member 108 comprises a rubber bumper.

It is understood that a separate stop member 108 is not necessary in order to implement embodiments of the present invention. As such, in one embodiment the stop member 108 comprises a solid plastic wall built into the housing 112 (e.g., FIG. 4F), in which case the cavity 112D is not present. For example, the stop member 108 comprising the top surface 108A may be substituted with a similar structure that is directly integrated with the housing 112 as one piece and as a solid wall, such as wall 108D shown in FIGS. 4E-4F described further below. In another embodiment, the stop member 108 may comprise a spring, etc.

The housing 112 further comprises one or more dampening posts 112P substantially aligned with the axis P for receiving a spring or metal clip thereon to support and provide additional dampening to the paddle 109.

Figure 3C:
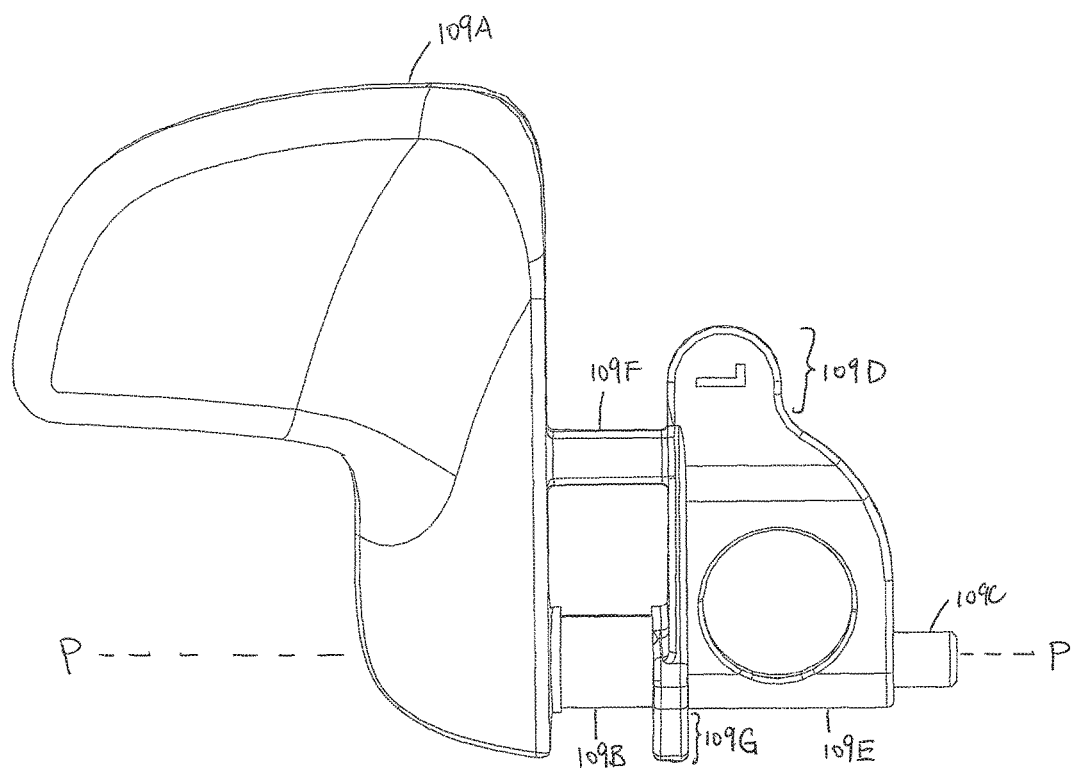
FIG. 3C shows a top view of a paddle of the paddle switch system, according to another embodiment.

FIG. 3C shows a top view of the paddle 109 to be used in system 100 shown in FIG. 1, according to one embodiment. The paddle 109 may be one piece for mounting onto the housing 112. The paddle 109 comprises a substantially L-shaped paddle portion 109A for receiving user input (e.g., push/pull on the paddle portion 109A) for gear selection for an automatic vehicle transmission. Such input comprises input via use of a driver's fingers imparting a force onto the substantially L-shaped paddle portion 109A away toward the driver during operation of the vehicle.

The paddle 109 further comprises a pivot member 109B, a shaft 109C, a depressor 109D, a member 109E, a support 109F, and a lever 109G. The pivot member 109B, the shaft 109C, the depressor 109D, the member 109E, and the support 109F of the paddle 109 are essentially coplanar with one another. The pivot member 109B and the shaft 109C comprise essentially circular cross-sections. The pivot member 109B and the shaft 109C are coaxially disposed on an axis P, and allow for the paddle 109 to freely rotate about the axis P on the housing 112.

The pivot member 109B essentially acts as a fulcrum about which the paddle 109 pivots in the housing in response to a force on the paddle. The pivot member 109B and the support 109F connect the L-shaped paddle portion 109A to the member 109E and the depressor 109D, wherein the pivot member 109B and the support 109F provide overall structural rigidity to the paddle 109.

When the lever 109G of the paddle 109 rests directly on the top surface 108A of the stop member 108, the depressor 109D simultaneously lightly rests upon or slightly depresses upon the dome switch 120 of the keypad 110, without fully depressing to close the switch 120. This provides a preloading condition for vibration reduction normally caused by paddle 109G in contact with the housing. A starting or original position of the paddle 109 in the operation of the system 100 comprises said preloaded condition for the paddle 109.

FIGS. 4A-4D show perspective views of the partially assembled system 100, according to one embodiment. FIG. 5 shows a side profile view of the assembled system 100, according to one embodiment.

Specifically, FIG. 4A shows a partially exploded view of the system 100, according to one embodiment, to clarify the assembly of components relating to the paddle 109. FIG. 4B shows a perspective view of the partially assembled system 100, according to one embodiment, omitting the paddle 109, the cover 104, the rocker 101, the center button 102, and the door 103 for clarity purposes.

FIG. 4C shows a perspective cross sectional view of the partially assembled system 100 as shown in FIG. 4B, according to one embodiment, omitting the paddle 109, the cover 104, the rocker 101, the center button 102, and the door 103 for clarity purposes.

Figure 4D:
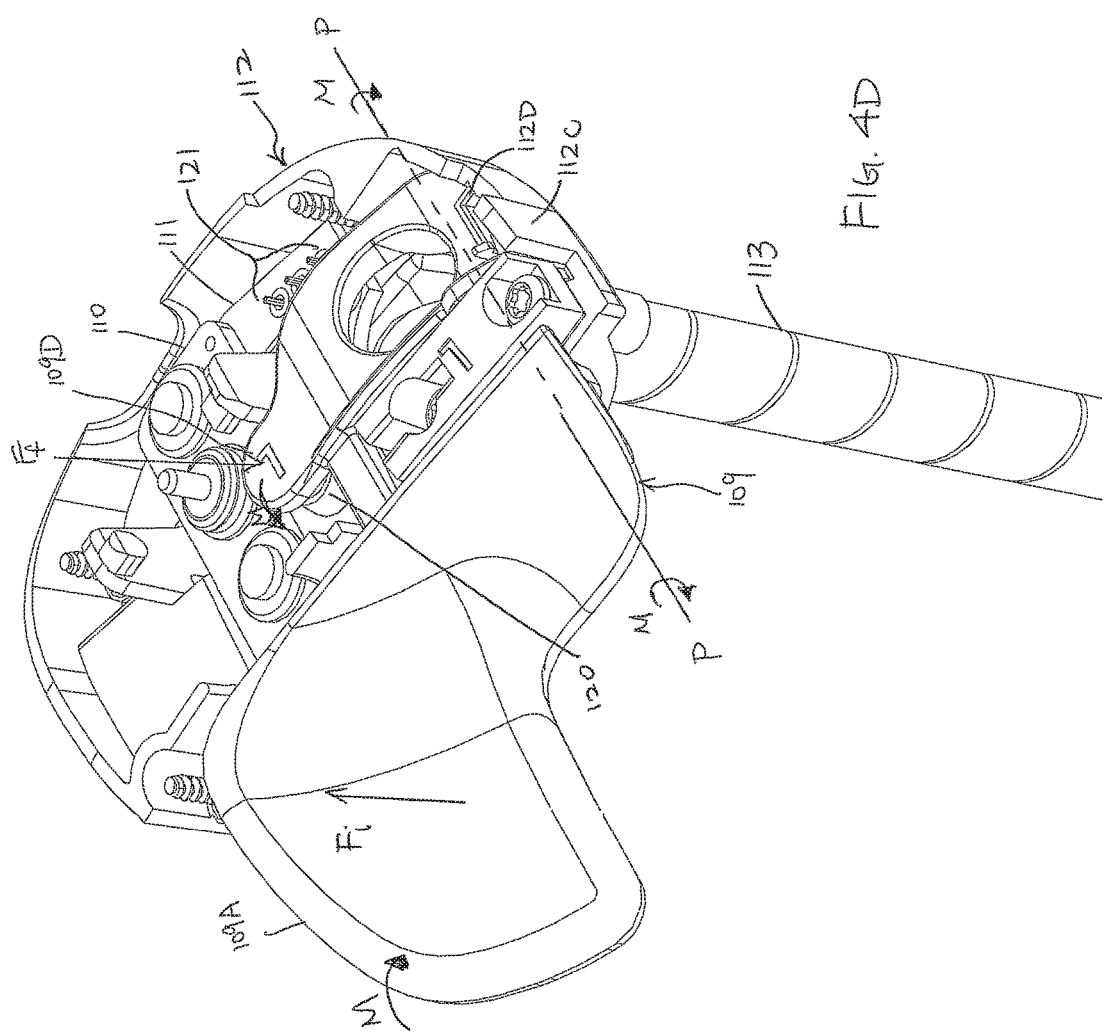
FIG. 4D shows another perspective view of the partially assembled paddle switch system, according to another embodiment.
Figure 5:
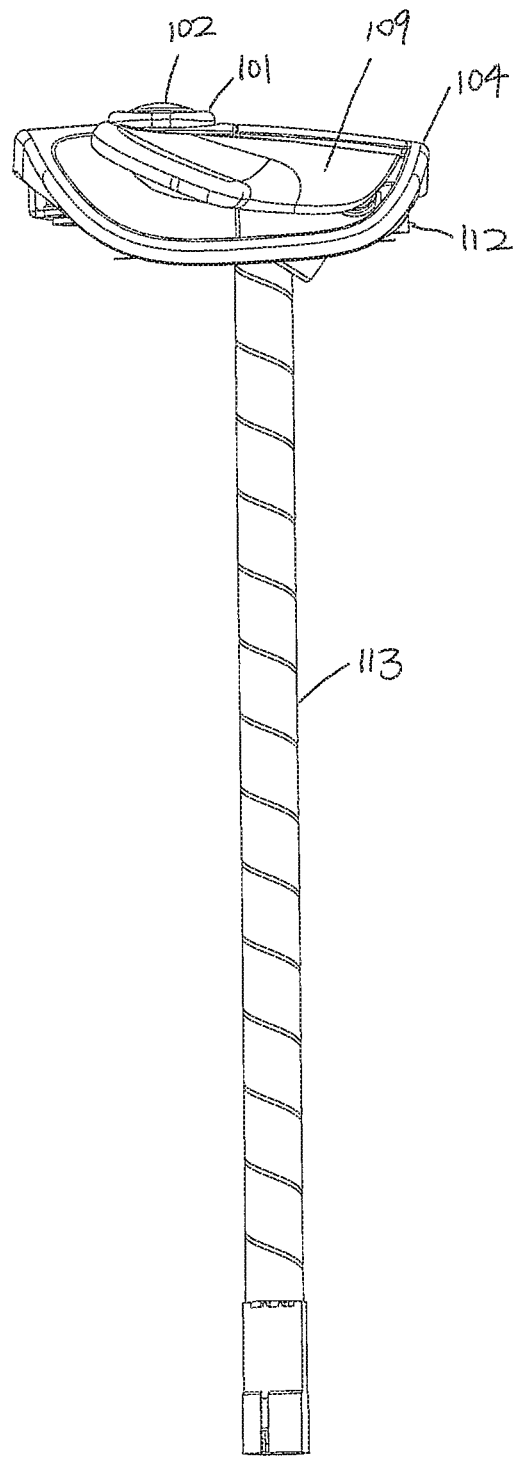
FIG. 5 shows a profile view of the assembled paddle switch system.

FIG. 4D shows another perspective view of the partially assembled system 100 including the paddle 109, according to one embodiment, omitting the cover 104, the rocker 101, the center button 102, and the door 103 for clarity purposes.

Referring to FIG. 4A, the system 100 comprises the PCB 111 and the keypad 110 disposed on the base of the housing 112. The housing 112 comprises a semicircular cutout 112A and a circular cutout 112B (FIG. 4B), wherein the semicircular cutout 112A receives the pivot member 109B of the paddle 109 and the circular cutout 112B receives the shaft 109C.

Once the system 100 is assembled, the shaft 109C rotatably protrudes out of the housing 112 through the circular cutout 112B, the pivot member 109B rests on the semicircular cutout 112A, and the depressor 109D, an element 109E, and a portion of the support 109F positioned within the confines of the housing 112. FIG. 4G shows a cross-section A-A of the system 100, wherein the pivot member 109B is maintained by the cutout 112A of the housing 112 and the arch 106C of the saddle 106, wherein the bumper 107 is positioned between the saddle 106 and the pivot member 109B.

FIG. 4B illustrates a perspective view of the partially assembled system 100, according to one embodiment, omitting the paddle 109, the cover 104, the rocker 101, the center button 102, and the door 103 for clarity purposes. The saddle 106 includes a cube-shaped cavity (not shown) for receiving the cube bumper 107. The saddle 106 further comprises an inside leg 106A, an outside leg 106B, and an arch 106C located therebetween as shown in FIG. 4C.

The cube bumper 107 may comprise elastomeric material. In one embodiment, the range of the elastomeric durometer of the cube bumper 107 is from about 35 to about 80. In one embodiment, the cube bumper 107 has an example edge dimension of about 0.125 inches. In order for the paddle switch to work in this durometer range, the cube bumper edge dimensions can be adjusted to overcome variations in dimensional stack-ups.

In instances when the system 100 experiences vibrations, the housing 112 and the cover 104 transmit the vibrations to the paddle 109 and the saddle 106 comprising the cube bumper 107 thereunder. The cube bumper 107 dampens and essentially acts as a buffer between the saddle 106 and the paddle 109, and thereby, the cube bumper 107 reduces the amount of vibrations transmitted to the paddle 109.

In instances when the paddle 109 in the system 100 is loosely seated in the system 100, the cube bumper 107 similarly reduces the range of movement of the loosely seated paddle 109, and thereby, the cube bumper 107 reduces the noise from a loose paddle 109.

It is understood that the cube bumper 107 need not be in the shape of a cube in order to implement the present invention. In other embodiments, the cube bumper 107 comprises various shapes and sizes, including a sphere, a rectangular prism, a triangular prism, a triangular pyramid, and the like. The elastomeric durometer range for said various shapes may vary from shape to shape and may need to be adjusted from size to size.

The circular cutout 112B and the combination of the semicircular cutout 112A and the arch 106C are generally coaxially aligned along the axis P. Once the paddle 109 is seated on the housing 112, the cube bumper 107 is seated on top of the pivot member 109B of the paddle 109 and under the saddle 106.

The paddle 109 is thereby rotatably secured to the housing 112 by way of the saddle 106 and the cube bumper 107, whereby the paddle 109 can rotate freely about the axis P on the pivot member 109B. The support 109F moves freely within an opening in the housing 112 about the axis P in movement coplanar with the rest of the paddle 109.

It is understood that the received cube bumper 107 need not solely be seated on top of the pivot member 109B of the paddle 109 and under the saddle 106 in order to implement the present invention. For example in other embodiments, the cube bumper 107 may be seated below the pivot member 109B of the paddle 109 and on top of a similar structure to the semicircular cutout 112A of the housing 112 (or directly integrated with the housing 112 in one piece) that receives the cube bumper 107 via a cube-shaped cavity (not shown). In other embodiments, multiple cube bumpers 107 may be used to implement a permutation of the aforementioned embodiments.

Depressor 109D is preloaded on the dome 120 of the keypad and controls the amount of preloading from depressor 109D on the dome of the keypad switch 120. In one embodiment, the switch 120 comprises a conductive rubber pill domes (e.g., rubber keypad with conductive pill).

The pivot member 109B is positioned in between the lever 109G and the depressor 109D, such that when the depressor 109D pivots down, the lever 109G pivots up, and vice versa. The lever 109G on one end of the paddle 109 is in contact with the stop member 108, while the depressor tab 109D on an opposing end of the paddle 109 is in contact with the dome 120. In one operation scenario, the stop member 108 is positioned such that the lever 109G is urged against the stop member 108, causing depressor tab 109D to adequately preload the dome switch 120 and maintain the dome switch 120 with sufficient preloading to provide desired tactile feel for closing the dome switch 120, while preventing rattling of paddle 120 in the housing 112. This provides balance between lever 109G and depressor 109D on either side of the pivot member 109B, and overall balance for the paddle portion 109A.

The combination of keypad dome 120, stop member 108, saddle 106, and bumper 107, stabilize and overcome inertia generated by weight of the paddle 109 when subjected to vibration.

The bumper 107 prevents buzz, shake, rattle (BSR) from the paddle 109 due to vibration when the paddle switch system 100 is installed in a vehicle. The placement and shape of stop member 108 allows preloading the keypad dome 120 with the paddle lever 109G.

FIG. 4C shows a cross sectional view of the partially assembled system 100 as shown in FIG. 4B, according to one embodiment, omitting the paddle 109, the cover 104, the rocker 101, the center button 102, and the door 103 for clarity purposes.

As shown in FIG. 4C, the axis P protrudes out of the page. Once the cover 104 is placed onto the housing 112 and the saddle 106 has been secured to the housing 112 by way of fasteners 105, the inside leg 106A of the saddle 106 is in contact with the housing 112 and the outside leg 106B is not in contact with the housing 112. A fastener 105 secures the outside leg 106B through the hole 104A of the cover 104 (not shown in FIG. 4C) to the housing 112.

FIG. 4D shows another perspective view of the partially assembled system 100 including the paddle 109, according to one embodiment, omitting the cover 104, the rocker 101, the center button 102, and the door 103 for clarity purposes. Once the system 100 is assembled, a driver desiring to change gear selection for an automatic vehicle transmission may impart an initial upward force Fi on the L-shaped paddle portion 109A.

Imparting the initial upward force Fi away from the wires 113 (e.g., toward the driver) onto the L-shaped paddle portion 109A causes a moment M about the axis P (e.g., toward the driver) and rotates the paddle 109 slightly away from the wires 113 (e.g., toward the driver).

The moment M about the axis P imparted on the L-shaped paddle portion 109A translates to a twisting motion to the member 109E and the depressor 109D, causing the depressor 109D to impart a final downward force Ff toward the wires 113 and depress the dome switch 120 of the keypad 110 for gear selection for an automatic vehicle transmission.

When the L-shaped paddle portion 109A is depressed, the depressor 109D of the paddle 109 is urged against the dome switch 120, to close the switch. When the L-shaped paddle portion 109A is released, a spring action of the dome switch 120 returns the switch 120 to a normal position which places the paddle back in the original position.

In another embodiment, the keypad 110 may comprise a spring (not shown), and upon depressing the dome switch 120 of the keypad 110, the spring imparts a recoiling force back to the depressor 109D and resets the paddle 109 in the original position.

After receiving the final downward force Ff on the dome switch 120 of the keypad 110, the PCB 111 converts the mechanical signal to an electrical signal for transmitting through the one or more wires 113 or other means of connection.

Figure 4E:
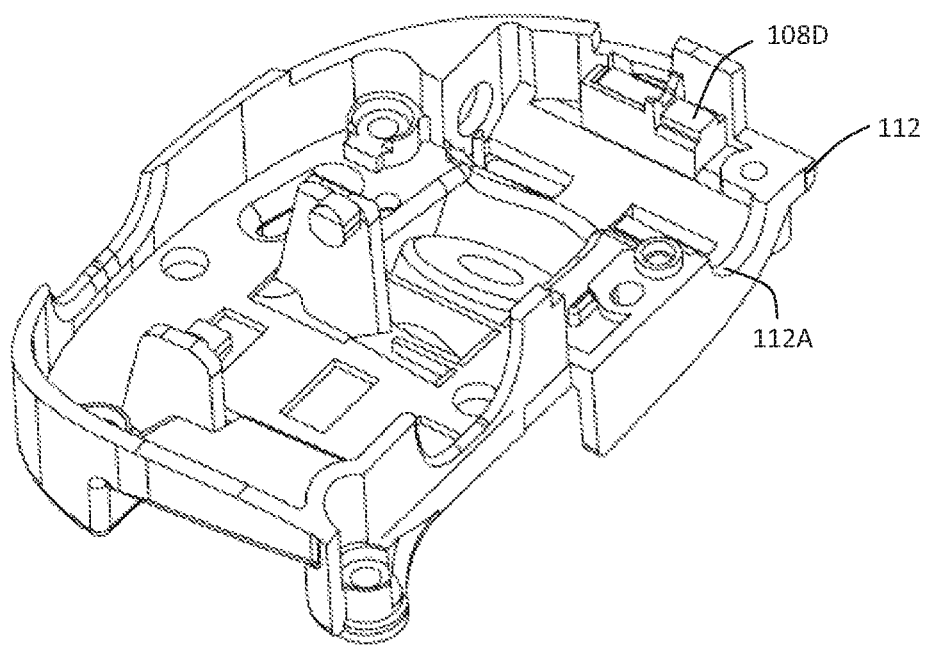
FIG. 4E shows a perspective view of a housing of the paddle switch system, according to another embodiment.
Figure 4F:
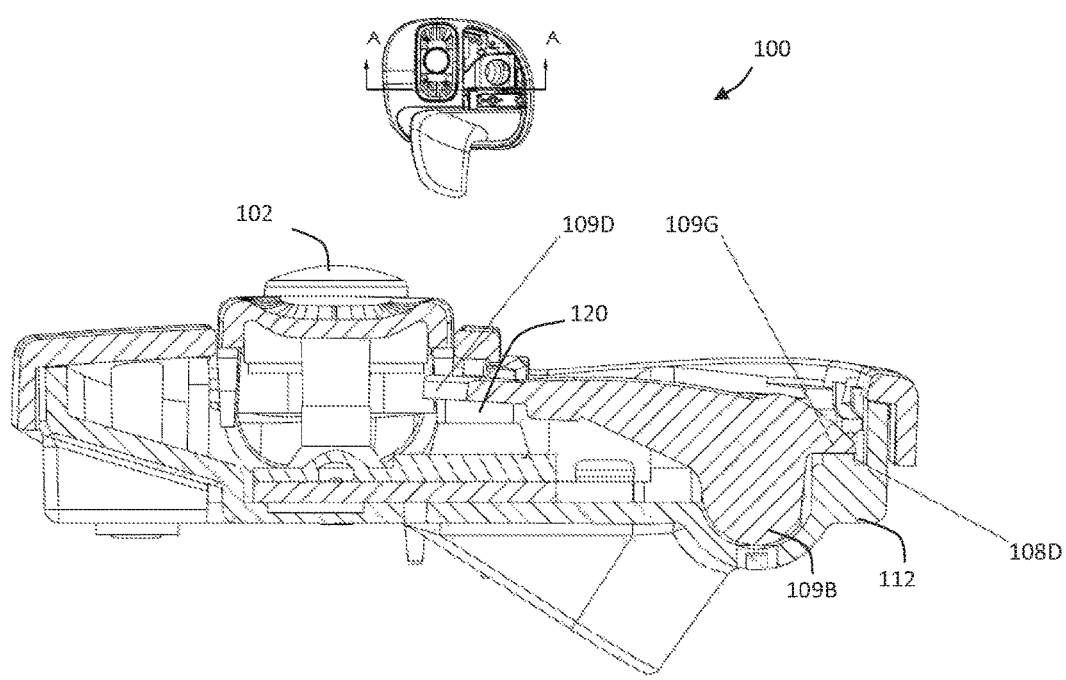
FIG. 4F shows a sectioned view of the paddle switch system, illustrating preloading of a keypad switch by a paddle of the paddle switch system, according to another embodiment.
Figure 4G:
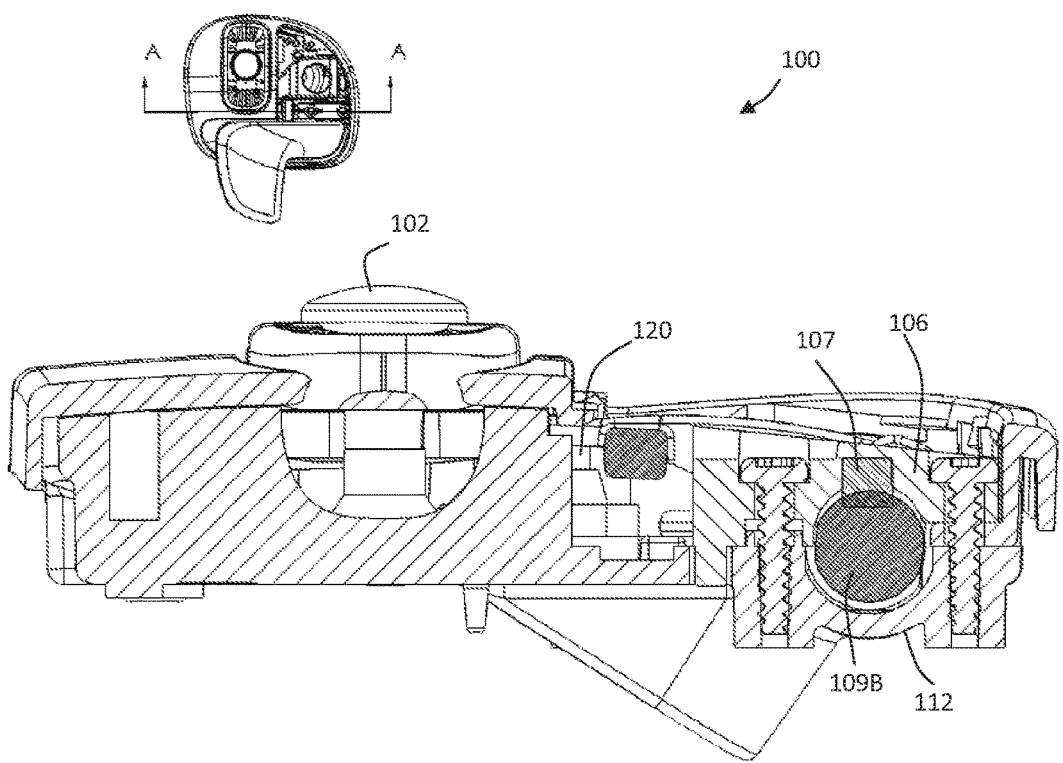
FIG. 4G shows a sectioned view of the paddle switch system, illustrating positioning of a vibration reduction member on a pivoting element of a paddle of the paddle switch system, according to another embodiment.

FIG. 4E shows a perspective view of the housing 112 in another embodiment. FIG. 4F shows a sectioned view of the assembled paddle switch system 100, illustrating preloading of the keypad switch 120, according to an embodiment. As illustrated in FIGS. 4E-4F, in one embodiment the housing 112 comprises said wall 108D, wherein as shown in the cross-section A-A of system 100 in FIG. 4F, the lever 109G comes in contact with (rests) on the wall 108D such as when the paddle 109 is not pushed/pulled by a user.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or an element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A paddle switch system, comprising:
   a housing;
   a paddle having a pivot member pivotally disposed in the housing, wherein the paddle is configured for operating an electrical switch within the housing in response to a force on the paddle, wherein the electrical switch comprises a dome switch, wherein the paddle further comprises a lever and a depressor with the pivot member therebetween, and wherein the lever is urged by a stop member such that the depressor partially preloads the dome switch;
   a cover coupled to the housing, wherein the housing and the cover partially enclose the paddle;
   a vibration reduction mechanism disposed in the housing and in constant contact with the paddle during rotation of the paddle, wherein the vibration reduction mechanism reduces external vibrations transmitted to the paddle.

2. The paddle switch system of claim 1, wherein the paddle is disposed in the housing to partially preload the dome switch.

3. The paddle switch system of claim 1, further comprising:
   at least one dampening post disposed in the housing, dampening post comprises an elongated member that is coupled to an opening in the housing.

4. The paddle switch system of claim 1, wherein:
   the cover comprises an essentially arcuate frame;
   the housing comprises an essentially arcuate frame, such that the housing and the cover partially enclose the paddle; and
   the system further comprising a circuit board disposed in the housing.

5. The paddle switch system of claim 1, wherein the vibration reduction mechanism is in contact with the pivot member of the paddle.

6. A paddle switch system, comprising:
   a housing;
   a paddle having a pivot member pivotally disposed in the housing, wherein the paddle is configured for operating an electrical switch within the housing in response to a force on the paddle, wherein the paddle further comprises a lever and a depressor such that the pivot member is disposed therebetween, and wherein the lever is urged by a stop member such that the depressor partially preloads the electrical switch;
   a cover coupled to the housing, wherein the housing and the cover partially enclose the paddle; and
   a vibration reduction mechanism disposed in the housing and in constant contact with the paddle during rotation of the paddle, wherein the vibration reduction mechanism reduces external vibrations transmitted to the paddle;
   wherein the paddle is disposed in the housing to partially preload the electrical switch.

7. The paddle switch system of claim 6, further comprising:
   at least one dampening post disposed in the housing, dampening post comprises an elongated member that is coupled to an opening in the housing.

8. The paddle switch system of claim 6, wherein said at least one dampening post comprises an elongated member having a first end coupled to an opening in the housing, and a second free end.

9. The paddle switch system of claim 6, wherein:
the cover comprises an essentially arcuate frame;
the housing comprises an essentially arcuate frame, such that the housing and the cover partially enclose the paddle; and
the system further comprising a circuit board disposed in the housing.

10. The paddle switch system of claim 6, wherein the vibration reduction mechanism is in contact with the pivot member of the paddle.

11. A paddle switch system, comprising:
a housing;
a paddle having a pivot member pivotally disposed in the housing, wherein the paddle is configured for operating an electrical switch within the housing in response to a force on the paddle, wherein the paddle further comprises a lever and a depressor such that the pivot member is disposed therebetween, and wherein the lever is urged by a stop member such that the depressor partially preloads the electrical switch;
a cover coupled to the housing, wherein the housing and the cover partially enclose the paddle;
at least one dampening post, each dampening post comprising an elongated member; and
a vibration reduction mechanism disposed in the housing and in constant contact with the paddle during rotation of the paddle, wherein the vibration reduction mechanism reduces external vibrations transmitted to the paddle.

12. The paddle switch system of claim 11, wherein the paddle is disposed in the housing to partially preload the electrical switch.

13. The paddle switch system of claim 11, wherein:
the cover comprises an essentially arcuate frame;
the housing comprises an essentially arcuate frame, such that the housing and the cover partially enclose the paddle; and
the system further comprising a circuit board disposed in the housing.

14. The paddle switch system of claim 11, wherein the vibration reduction mechanism is in contact with the pivot member of the paddle.

15. The paddle switch system of claim 11, wherein said at least one dampening post comprises an elongated member having a first end coupled to an opening in the housing, and a second free end.

* * * * *